United States Patent [19]

Theodorides

[11] 4,411,068
[45] Oct. 25, 1983

[54] HAND SAW
[76] Inventor: Panos Theodorides, 595 River St., Mattapan, Mass. 02126
[21] Appl. No.: 284,735
[22] Filed: Jul. 20, 1981
[51] Int. Cl.³ ............................................. B23D 45/00
[52] U.S. Cl. ................................ 30/166 R; 145/31 R; 145/108 R
[58] Field of Search .................... 30/166 R; 145/31 R, 145/108 R, 108 B

[56] References Cited
U.S. PATENT DOCUMENTS

| | | | |
|---|---|---|---|
| 194,659 | 8/1877 | Disston et al. | 145/108 R |
| 360,854 | 4/1887 | Clemson et al. | 145/108 R |
| 552,342 | 12/1895 | White | 145/108 B |
| 1,423,506 | 7/1922 | Slothower | 30/166 |
| 2,145,985 | 2/1939 | Krajicek | 30/320 |
| 2,262,540 | 11/1941 | Stone | 145/108 R |
| 2,331,638 | 10/1943 | Taylor | 145/108 R |
| 2,431,235 | 11/1947 | Flaa | 30/166 |
| 2,621,689 | 12/1952 | Fordon | 145/31 R |
| 2,735,463 | 2/1956 | Philbrick | 145/31 R |
| 2,966,931 | 1/1961 | Dreier | 145/31 R |
| 3,348,309 | 10/1967 | Jones | 145/108 R |
| 3,791,014 | 2/1974 | Perna | 30/294 |
| 3,803,648 | 4/1974 | King | 145/108 R |

FOREIGN PATENT DOCUMENTS

| | | | |
|---|---|---|---|
| 113781 | 4/1945 | Sweden | 145/108 R |
| 206486 | 8/1939 | Switzerland | 145/108 R |
| 16921 | of 1899 | United Kingdom | 145/108 R |
| 935876 | 9/1963 | United Kingdom | 145/31 R |

Primary Examiner—Frederick R. Schmidt
Assistant Examiner—J. T. Zatarga
Attorney, Agent, or Firm—Wolf, Greenfield & Sacks

[57] ABSTRACT

A hand saw having a straight tubular handle and a band saw-type blade secured thereto and forming an extension of the handle. The handle can be gripped right up to the blade to facilitate its use, and the blade can be stored in the handle.

5 Claims, 5 Drawing Figures

U.S. Patent  Oct. 25, 1983  4,411,068
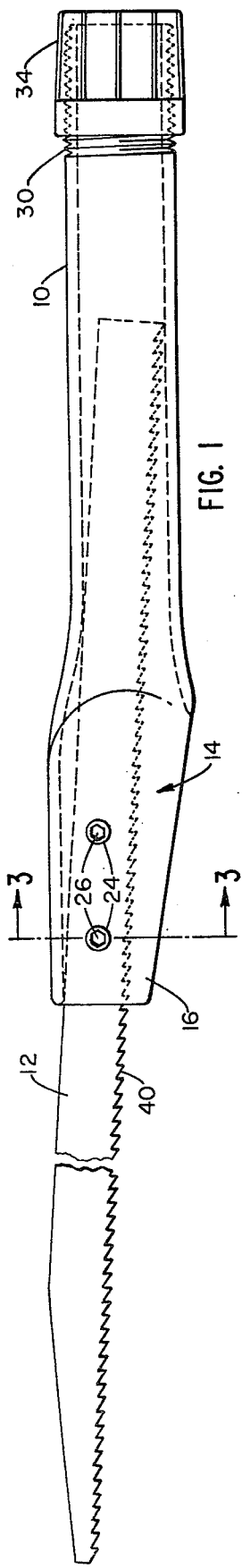
FIG. 1
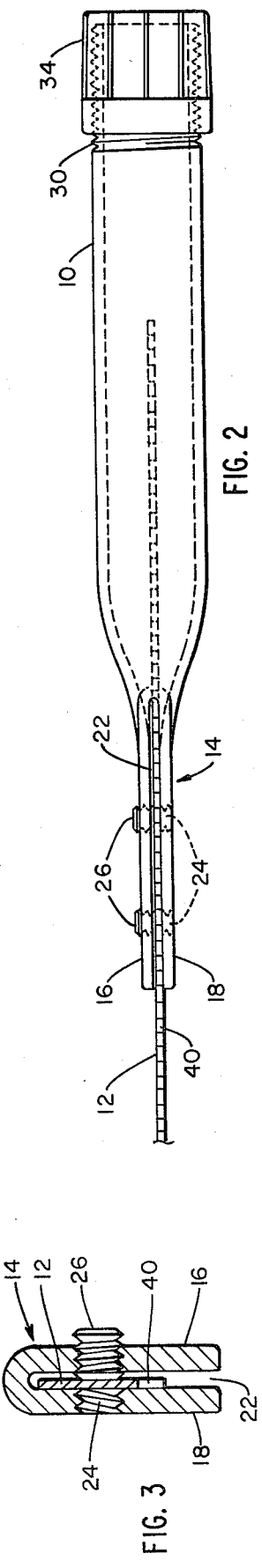
FIG. 2
FIG. 3
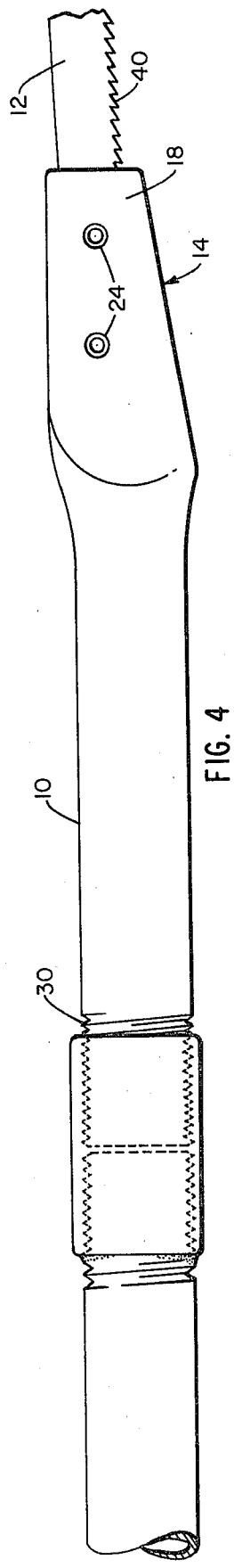
FIG. 4
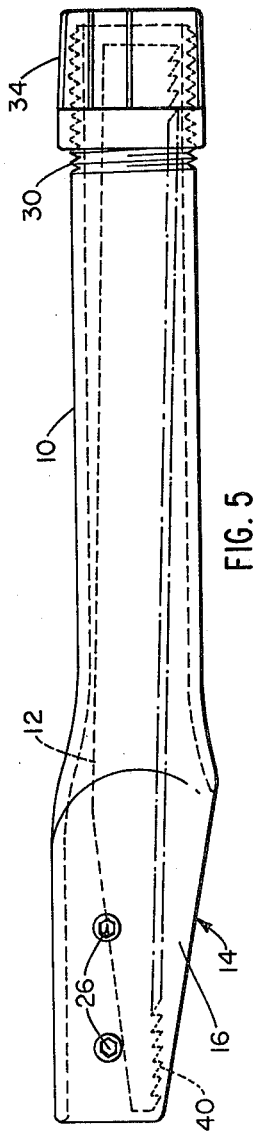
FIG. 5

HAND SAW

INTRODUCTION

This invention relates to saws and more particularly to a small hand saw having a blade which forms an axial extension of the handle.

The hand saw of the present invention is very inexpensive to manufacture and is particularly easy for the user to manipulate. The handle is made of tubular metal stock, which is collapsed at one end to form a pair of closely spaced parallel walls that engage one end of the blade of the saw when the device is assembled. A pair of set screws extend through one of the walls to hold the blade in place. The configuration of the handle is such that the blade when not in use can be at least partially stored inside the handle to make the saw easier to carry about or to stow away. The handle configuration also enables the user to grasp it immediately adjacent the blade so that the blade may be manipulated precisely for fine, precision work and maximum force may be applied to it. The handle is also provided with a threaded end remote from the collapsed portion, which enables a handle extension to be screwed onto the main handle portion when it is desired to use the saw to cut at a relatively inaccessible location.

The invention will be better understood and appreciated from the following detailed description read in connection with the accompanying drawings.

BRIEF FIGURE DESCRIPTION

FIG. 1 is a side view of the assembled hand saw of the present invention;

FIG. 2 is a fragmentary bottom view of the hand saw of FIG. 1 showing the area where the handle and blade are joined;

FIG. 3 is a cross sectional view taken along the section line 3—3 of FIG. 1;

FIG. 4 is a fragmentary view of the handle with its cap removed and illustrating how an extension may be secured to it; and FIG. 5 is a side view of the hand saw, with parts broken away; to show how the blade may be stored inside the handle.

DETAILED DESCRIPTION

The hand saw of the present invention includes a handle 10 and blade 12 which are shown in FIG. 1 to be secured together in axial alignment in the operative mode. That is, with the blade mounted as shown in FIG. 1, the saw may be used for its intended purpose. When the saw is not in use, the blade 12 may be stored in the handle as shown in FIG. 5.

The handle 10 typically may be made of extruded aluminum tubing. The end 14 of the handle is shown collapsed so as to define two closely spaced parallel walls 16 and 18 between which the end 19 of the saw blade 12 is disposed and secured in place. The slot 20 defined between the walls 16 and 18 is open along one side as suggested at 22 to facilitate insertion of the blade end into the slot. As shown in the drawings, a pair of threaded openings 24 are provided in each of the walls 16 and 18, and set screws 26 are screwed into the openings and bear against the side of the blade to secure the blade in place. Because threaded holes are provided in both walls 16 and 18, the blade can be secured in place from either side of the handle for the convenience of the user.

The end 30 of the handle remote from the blade 12 is externally threaded as shown at 32, and the threads 32 are covered by a cap 34 to prevent the threads from cutting the skin of the hand when the hand saw is used. The cap 34 may be readily removed merely by unscrewing it from the handle so as to expose the threads 32. The threads in turn may be used to secure a handle extension 36 to the handle by means of a coupling 37, as suggested in FIG. 4, when it is desired to use the handle to cut something in a remote location. For example, if the saw is to be used for cutting limbs from a tree, a long pole-type extension may be secured to the handle 10 so as to enable the user to reach tree limbs that are beyond the user's ordinary reach.

The blade 12 as shown in the drawing is provided with teeth 40 along one side thereof. Typically the blade is of the band-saw type and specifically may be made from a Doall band saw blade. The tempered steel from which the blade is made is quite flexible so that it may temporarily bend to accommodate the sawing action. Preferably, the steel of the blade is sufficiently thin so that the blade may be trimmed by a pair of heavy shears to remove dulled parts of it. For example, if the remote end of the blade is used for an extended period to the exclusion of the remainder of the blade because of the nature of the work performed by the saw, the user may conveniently clip off the end of the blade carrying the dulled teeth so as to provide sharp teeth at the new end. And the set screws can be loosened to extend the blade further from the handle to provide a convenient cutting length.

The handle, which is approximately ¾ inch in diameter and 7 inches long is so shaped that it can be conveniently engaged by the hand even at the flattened portion of the handle so as to provide maximum control over the blade when fine work is being performed. The teeth of the blade are confined within the handle throughout the handle length so that the teeth will not scratch or cut the user accidentally. And the user can apply maximum leverage on the blade at the location of the collapsed end 14 when that is desired.

In FIG. 5, the blade is shown stored inside the handle. Depending upon the length of the blade, all or a major portion of the blade may be stored inside the handle when the saw is not in use. The blade may be quickly removed from the operating position on the handle by loosening the set screws 26, and it may then be slipped into the handle which, of course, is hollow.

From the foregoing description it will be appreciated that the saw of this invention may be made very inexpensively. And because of the handle configuration, it may be readily manipulated by the user and is, therefore, very convenient.

Having described the invention in detail, those skilled in the art will appreciate that modifications may be made of this invention without departing from its spirit. Therefore, it is not intended to limit the breadth of this invention to the single embodiment illustrated and described. Rather, the scope of the invention is to be determined by the appended claims and their equivalents.

What is claimed is:

1. A hand saw comprising
   a straight, hollow, tubular handle, one end of the handle being collapsed to form two closely spaced parallel walls with a slot cut through the handle at adjacent edges of said walls and aligned with the space between the walls, threads provided on the other end of the handle to enable a handle extension to be secured thereto, a straight band saw-type blade with teeth along one edge, narrower than the parallel walls so that the blade is fully confined by the handle to the very end of the handle at the collapsed end, said blade also having one end disposed between the closely spaced parallel walls and with the teeth of the saw facing the slot, said blade being axially aligned with the handle so as to form an extension thereof, and a pair of set screws mounted in one of the parallel walls and bearing against one side of the blade to releasably retain the blade on the handle.

2. A hand saw according to claim 1 further characterized by said handle having a chamber therein and said blade being stowable inside the handle.

3. A hand saw comprising a handle having a straight, hollow, tubular body circular in cross section, one end of said tubular body being collapsed to form two parallel walls with a slot between them very slightly wider than the thickness of a blade to be carried by the handle, a slit in the body aligned with one edge of the slot to provide access to the slot from one side thereof, said slot also being open at said one end of the handle and said handle being suitable for storing blades inside its tubular body, threads provided on the other end of the handle to enable a handle extension to be secured thereto, a straight band saw-type blade with teeth inclined toward the handle along one edge and having a portion of the blade disposed in the slot with the teeth of the blade facing in the direction of the slit, said blade being axially aligned with the handle and with a portion of the blade extending into the circular portion of the handle and the working end of the blade also extending out of the handle through the open end, the height of the slot being greater than the height of the blade and the slot being closed at the top to prevent the hand of the user from engaging the blade when the handle is gripped at that end and force is applied on the handle in the direction of the teeth of the blade, and a pair of set screws in the body extending through one of the walls to bear against the blade to hold it in any selected position in the slot of the handle.

4. A hand saw according to claim 3 further characterized by said blade being axially aligned with the handle.

5. A hand saw according to claim 4 further characterized by a cap threaded onto the threads of the handle to close said other end when no handle extension is used and for closing the interior of the tubular body.

* * * * *